United States Patent
Kuchler et al.

(10) Patent No.: US 6,709,745 B2
(45) Date of Patent: Mar. 23, 2004

(54) ELECTROMAGNETIC ABSORBER MATERIAL, METHOD FOR THE PRODUCTION THEREOF AND METHOD FOR THE PRODUCTION OF SHIELDING DEVICES THEREOF

(75) Inventors: Josef Kuchler, Wunsiedel (DE); Jan-Thomas Kuehnert, Rudolstadt (DE); Klaus Kupfer, Weimar (DE); Stefan Rossmayer, Marktredwitz (DE); Wolfgang Schoeps, Hermsdorf (DE); Hans-Werner Zier, Weimar (DE)

(73) Assignees: Hermsdorfer Institut Fuer Technische Karamik E.V., Hermsdorf (DE); Colfirmit Rajasil GmbH & Co. KG, Marktredwitz (DE)

( * ) Notice: Subject to any disclaimer, the term of this patent is extended or adjusted under 35 U.S.C. 154(b) by 0 days.

(21) Appl. No.: 10/089,665

(22) PCT Filed: Aug. 8, 2001

(86) PCT No.: PCT/EP01/09154

§ 371 (c)(1),
(2), (4) Date: Aug. 13, 2002

(87) PCT Pub. No.: WO02/13311

PCT Pub. Date: Feb. 14, 2002

(65) Prior Publication Data

US 2003/0108744 A1 Jun. 12, 2003

(30) Foreign Application Priority Data

Aug. 10, 2000 (DE) .......................................... 100 39 125

(51) Int. Cl.⁷ ................................................ B32B 5/16
(52) U.S. Cl. ..................... 428/403; 428/406; 428/433; 428/655; 428/683; 428/913; 427/128; 427/129; 427/130; 427/131; 427/132; 427/212; 427/213; 427/269; 252/513; 252/519
(58) Field of Search ................................. 428/403, 406, 428/433, 913, 655, 683; 252/513, 519; 427/128–132, 212, 213, 269

(56) References Cited

U.S. PATENT DOCUMENTS

| | | | | |
|---|---|---|---|---|
| 3,721,982 A | * | 3/1973 | Wesch | |
| 5,326,640 A | * | 7/1994 | Japka | |
| 5,561,428 A | * | 10/1996 | Czaja et al. | 342/1 |
| 5,786,785 A | * | 7/1998 | Gindrup et al. | 342/1 |
| 6,373,425 B1 | * | 4/2002 | Inoue et al. | 342/1 |

FOREIGN PATENT DOCUMENTS

| | | |
|---|---|---|
| DE | 4142480 A1 | 7/1993 |
| DE | 19718694 A1 | 11/1998 |
| DE | 198 00 868 | 7/1999 |
| DE | 19860878 A1 | 6/2000 |
| DE | 199 11 304 | 9/2000 |
| DE | 100 03 760 | 8/2001 |
| DE | 101 22 472 | 1/2002 |
| DE | 100 39 125 | 2/2002 |
| DE | 101 22 473 | 11/2002 |
| EP | 0831074 A3 | 3/1998 |

* cited by examiner

*Primary Examiner*—Leszek Kiliman
(74) *Attorney, Agent, or Firm*—Jordan and Hamburg LLP

(57) ABSTRACT

A method for effectively decreasing electromagnetic radiation by means of active absorbing material in a broad frequency band, preferably from 100 MHz–10 GHz, is provided wherein the material combines the desired shielding properties with the heat insulating properties of a porous material in addition to providing a favourable ratio between density and resistance. The method includes use of an absorber granulate which consists of a highly porous glass and/or ceramic granulate which is coated or filled with ferrite and/or an electrically conductive material.

17 Claims, 2 Drawing Sheets

ELECTROMAGNETIC ABSORBER MATERIAL, METHOD FOR THE PRODUCTION THEREOF AND METHOD FOR THE PRODUCTION OF SHIELDING DEVICES THEREOF

BACKGROUND OF THE INVENTION

The invention relates to an electromagnetic absorber material, to a method for producing it as well as to a method for producing shielding devices, such as absorber walls, absorber linings or absorber housings, including so-called anechoic measurement chambers, which are free of electromagnetic fields, using these absorber materials.

The invention is directed to the creation of conditions, as free as possible of fields, for carrying out especially accurate and/or particularly sensitive electrical measurements, as well as to protecting the population and, in particular, the employees during the commercial use of alternating electromagnetic fields against possible harmful effects.

It can be inferred from the discussion of the concept of "electrosmog" that the population has been sensitized to the industrially produced accumulation of electromagnetic radiation in the natural environment. Legislators as well as trade associations have reacted with enacting or tightening regulations concerning the maximum permissible power density of a source of radiation. The $26^{th}$ BimSchV (Regulation Concerning Electromagnetic Fields) and the DIN VDE 0848 (Safety in Electromagnetic Fields) are mentioned as examples here. The limiting values, set down in the $26^{th}$ BimSchV to protect the population, are based on international recommendations, such as the International Commission for Protection against Nonionizing Radiation (ICNIRP) or the World Health Organization (WHO). These recommendations are revised whenever new scientific results are obtained. The most recent publication of the ICNIRP of April 1998 confirms the values, which form the basis for the $26^{th}$ BimSchV.

The limiting DIN VDE 0848 values for high frequency fields, permissible for the general population, are given in Table 1.

TABLE 1

| | Limiting Values for the General Population | |
|---|---|---|
| | | Effective Values of the |
| Frequency f (MHz) | Electrical Field Strength E (V/m) | Magnetic Field Strength H (A/m) |
| 10–400 | 27.5 | 0.073 |
| 400–2000 | 1.375 √f | 0.0037 √f |
| 2000–300000 | 61.0 | 0.16 |

The division of the regulation into electrical and magnetic field components is due to the considerable expense of measuring the specific absorption rate (SAR(W/kg)). The SAR is the basic quantity for thermal effects, which is recognized worldwide, since the beam power, absorbed by the body, determines the biological effect of HF radiation.

According to current findings, SAR values of 1 to 4 W/kg (averaged over the whole body) lead to an increase in body temperature of 1° C. in man within thirty minutes. A limiting, whole body, SAR value of 0.4 W/kg was fixed for protecting professionally exposed persons and a value of 0.08 W/kg was fixed for protecting the general population.

The problem of these limiting or precautionary values consists therein that, merely by the promulgation, a hazard is suggested to the population or the population is sensitized to a long-term effect, which is possibly not yet confirmed with certainty. This is reinforced further by the strictly technical discussion, that is, the exclusive reference to thermal effects. WHO, ICNIRP and IEGMP studies, currently taking place or already published, especially of the effects of using mobile phones on brain currents due to the frequency and modulation of the radiation of such phones, are pushing the so-called athermal effects increasingly into the foreground. For this reason and in expectation of positive results of studies taking place at the present time, in the sense of affecting the human body, the development of an absorber granulate for protecting the resident population has become an urgent necessity.

Predominantly ferrites and/or conductive substances in different mixtures and matrices are obtainable for absorbing electromagnetic waves. For example, Ferrite Domen Co. in Russia is offering ferrites in powder form as a microwave absorber; they have a useful frequency of 1 to a maximum of 40 GHz. Spectro Dynamic Systems in the USA is selling silver-coated Cenospheres for HF absorption. The latter are to be used as fillers in paint and resins for producing surface coatings. In an example, the damping performance is stated to be 60 dB from 100 MHz to 10 GHz for a film that is 5 mm thick. TDK is offering a range of radio-wave absorbers with a reflection damping in excess of 20 dB, a range from 0.03 to 40 GHz being covered. A further absorber is sold by Emerson and Cuming Microwave Products, Inc. under the name of ECCOSORB®MCS for frequencies ranging from 1 to 8 GHz with a damping of 6 to 63 dB/cm.

In the German Offenlegungsschrift 199 49 631 A1, a composite absorber for electromagnetic waves is described, for which a ferrite powder with a dielectric constant not greater than 4.9 is dispersed in a conventional resin, shaped into a pyramidal absorber and combined with a ferrite plate. The main components of the ferrite plate are stated to be $Fe_2O_3$, NiO, ZnO and CuO and the main components of the resin-bound pyramidal absorber are stated to be $Fe_2O_3$, NiO, and ZnO. At frequencies ranging from 100 MHz to 10 GHz, the achievable damping is stated to be at least 20 dB.

The German Offenlegungsschrift 195 25 636 A1 discloses a wall coating for absorbing electromagnetic waves. This wall coating makes possible a broadband reflection by the composite of a ferrite plate with a resistance material, facing the wall. Measured values for the reflection damping achieved are not given.

U.S. Pat. No. 5,323,160 discloses the production of an absorber by combining two soft ferrites (Mn—Zn, Ni—Zn) to form layers of different thicknesses. In every case, these layers are applied on a metal as support. Measurements reveal damping of at least 20 dB at frequency ranging from 200 MHz to 1 GHz.

U.S. Pat. No. 5,446,459 discloses a broadband absorber consisting of a sintered ferrite and a $CuO$—$Fe_2O_3$ spinell ferrite. The absorption is measured with the help of an HP 8510A Network Analyzer using a coaxial measuring lead. Frequency ranges with damping in excess of 20 dB are claimed for different compositions. These frequency ranges are between a minimum of 98 MHz and a maximum of 950 MHz.

The publication EP 0 858 982 A1 discloses a composition for an absorber and the method for producing it. The absorber is composed of a mixture of $Fe_2O_3$, NiO, ZnO and CuO, which is ground, molded and sintered. The absorption rates are measured by means of the Holaday HI-400 RF Measuring System at different distances from a mobile phone. The absorption rates are given as percentages.

The German Offenlegungsschrift DE 199 11 304 A1 discloses a coating or film for shielding electromagnetically over a wide range of frequencies. For this purpose, a ferrite powder is mixed with a conductive powder and processed with the help of a paintable binder into films or coatings. The measured damping values are stated to be in excess of 30 dB/mm.

The state of the art, described above, suffers from the shortcoming that, using in some cases expensive methods and materials, only the aspect of an electromagnetic shielding is taken into consideration without regard to the applicability of these technologies in construction.

SUMMARY OF THE INVENTION

It is therefore an object of the invention to decrease the electromagnetic radiation effectively in a broad frequency band, preferably from 100 MHz to 10 GHz by means of an absorber material, this material combining the desired shielding properties with the thermal insulation properties of a porous material as well as with the advantageous relationship between density and strength of the latter.

DETAILED DESCRIPTION

Figure 1:
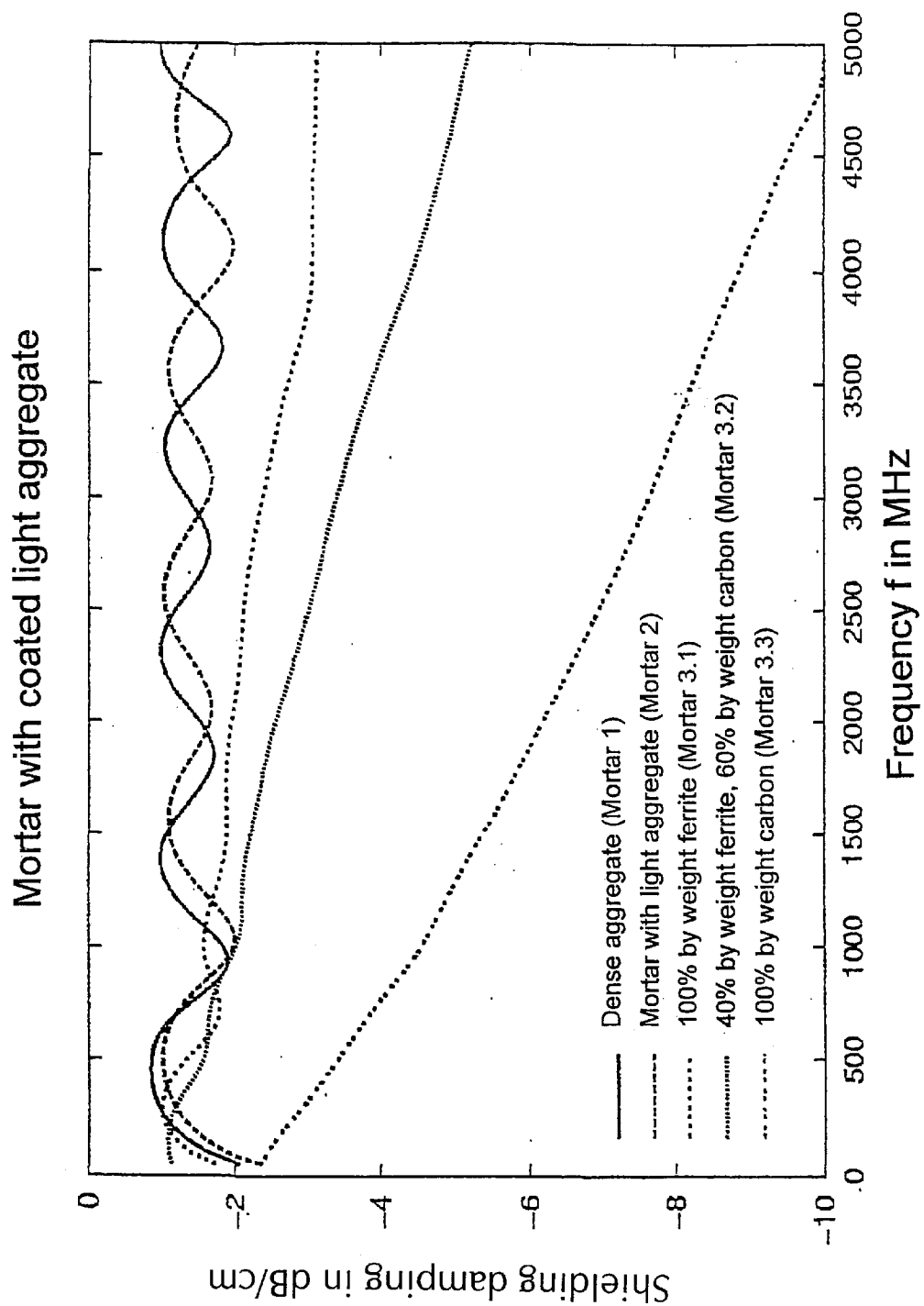
FIG. 1 is a graph showing shielding levels versus frequency of examples of mortar mixtures of several examples coated with light aggregate.

The advantages of the invention are made clear by the following comparison of the characteristic values of the mortars M1 (conventional compact mortar) and M2 (mortar filled with a conventional light aggregate in the form of an expanded glass granulate without an electromagnetic shielding effect) with the characteristic values of the mortars M3.1, M3.2, M3.3 (coated, expanded, glass granulate) as well as M4 (filled, expanded glass granulate), which were produced pursuant to the invention.

The invention is described in grater detail below by means of different examples.

To begin with, 4 examples of the preparation of a coated expanded glass granulate are presented.

The expanded glass granular used is characterized by a porosity of about 82 percent and a density of about 430 kg/m$^3$.

EXAMPLE 1

In each case, 2.5 L of expanded glass granulate with a particle size of 0.25 mm to 0.50 mm or of 0.5 mm to 1.0 mm was added. The coating suspension consisted of 1,500 g of ferrite powder, 375 g of a binder solution and 1,350 g of water. This suspension was sprayed by means of a two-material nozzle onto the granulate in the fluidized bed. The granulate obtained was subsequently treated for 16 hours at 200° C. in order to solidify the binder.

EXAMPLE 2

In each case, 2.5 L of expanded glass granulate with a particle size of 0.25 mm to 0.50 mm or of 0.5 mm to 1.0 mm was added. The coating suspension consisted of 1,085 g of ferrite powder, 315 g of graphite, 375 g of a binder solution and 1,300 g of water. This suspension was sprayed by means of a two-material nozzle onto the granulate in the fluidized bed. The granulate obtained was subsequently treated for 16 hours at 200° C. in order to solidify the binder.

EXAMPLE 3

In each case, 2 L of expanded glass granulate, with a particle size of 0.25 mm to 0.50 mm or of 0.5 mm to 1.0 mm were transferred to the plate of a TP 10 Eirich plate granulator. A mixture of 600 g of carbon powder and 400 g of ferrite powder was premixed with an MTI mixer and, alternating with the surface moistening of the granulate with about 600 g of the binder solution, applied on the granulate. The granulate obtained was subsequently treated for 16 hours at 200° C. in order to solidify the binder.

EXAMPLE 4

In each case, 2 L of expanded glass granulate, with a particle size of 0.25 mm to 0.50 mm or of 0.5 mm to 1.0 mm were transferred to the plate. Alternating with the surface moistening of the granulate with the binder solution, 1,000 g of carbon powder was applied on the granulate. The granulate obtained was subsequently treated for 16 hours at 200° C. in order to solidify the binder.

Further Examples 5 to 7 of the preparation of a filled expanded glass granulate of Example 2 are listed below.

TABLE 2

Starting mixtures for the Preparation of Filled Expanded Granulates (in parts by weight):

|  | Example 5 | Example 6 | Example 7 |
|---|---|---|---|
| Glass Powder | 50 parts | 66 parts | 75 parts |
| Ferrite Powder | 50 parts | 34 parts | 25 parts |
| Carbon Powder | 20 parts | 20 parts | 20 parts |

These mixtures were granulated with a binder and a blowing agent, dried and expanded at a temperature above the softening temperature of the glass used.

In comparison to the bulk density of the quartz sand used of 1,200 to 1,500 kg/m$^3$, the following bulk densities are obtained, for example:

TABLE 3

Bulk Densities of the Filled Expanded Glass Granulates (in kg/m$^3$)

|  | Example 5 | Example 6 | Example 7 |
|---|---|---|---|
| 0.25–0.5 | 919 | 833 | 725 |
| 0.5–1.0 mm | 822 | 784 | 656 |

To check the effectiveness of the present invention, four mortar compositions went prepared:

M1: Mortar with quartz sand up to 1 mm as a dense additive (labeled [1] in the following Table of Compositions)
M2: Compared to mortar M1, the 0.25 mm to 0.50 mm quartz sand fraction is exchanged for the same volume of uncoated expanded glass granulate and the same particle size fraction (as characterized above) (labeled [2] in the following Table of Compositions)
M3.1 similar to M2, however with an expanded glass granulate, coated with Mn—Zn ferrite as in Example 1 (labeled [3] in the following Table of Compositions)
M3.2 similar to M2, however with an expanded glass granulate, -continued

| | |
|---|---|
| | coated with Mn—Zn ferrite as well as with carbon as in Example 3 (labeled [4] in the following Table of Compositions) |
| M3.3 | similar to M2, however with an expanded glass granulate, coated with carbon as in Example 3 (labeled [5] in the following Table of Compositions) |
| M4 | similar to M2, however with expanded glass granulate, filled with carbon and ferrite corresponding to Example 5 (labeled [6] in the following Table of Compositions). |

TABLE 4

Composition of the Mortar (in g)

| | White Lime Hydrate | White Cement | Fine Sand <0.125 mm | Sand 0–0.25 mm | Additive 0.25–0.5 mm | Additive 0.5–1.0 mm |
|---|---|---|---|---|---|---|
| Mortar M1 | 11.2 | 7.4 | 6.5 | 16.7 | 46.6 [1] | 29.3 [1] |
| Mortar M2 | 11.2 | 7.4 | 6.5 | 16.7 | 9.0 [2] | 20.9 [2] |
| Mortar M3.1 | 11.2 | 7.4 | 6.5 | 16.7 | 23.6 [3] | 11.0 [3] |
| Mortar M3.2 | 11.2 | 7.4 | 6.5 | 16.7 | 15.8 [4] | 8.3 [4] |
| Mortar M3.3 | 11.2 | 7.4 | 6.5 | 16.7 | 13.2 [5] | 6.8 [5] |
| Mortar M4 | 11.2 | 7.4 | 6.5 | 16.7 | 30.5 [6] | 14.1 [6] |

Types of Additives:

[1] quartz sand
[2] expanded glass
[3] coated expanded glass of Example 1
[4] coated expanded glass of Example 3
[5] coated expanded glass of Example 4
[6] filled expanded glass of Example 5.

The measurements where made with the help of an HP 8510 A network analyzer and a coaxial lead 16/100. In this connection, the shielded damping S is composed additively of the adsorption A portion and the reflection R portion.

Figure 2:
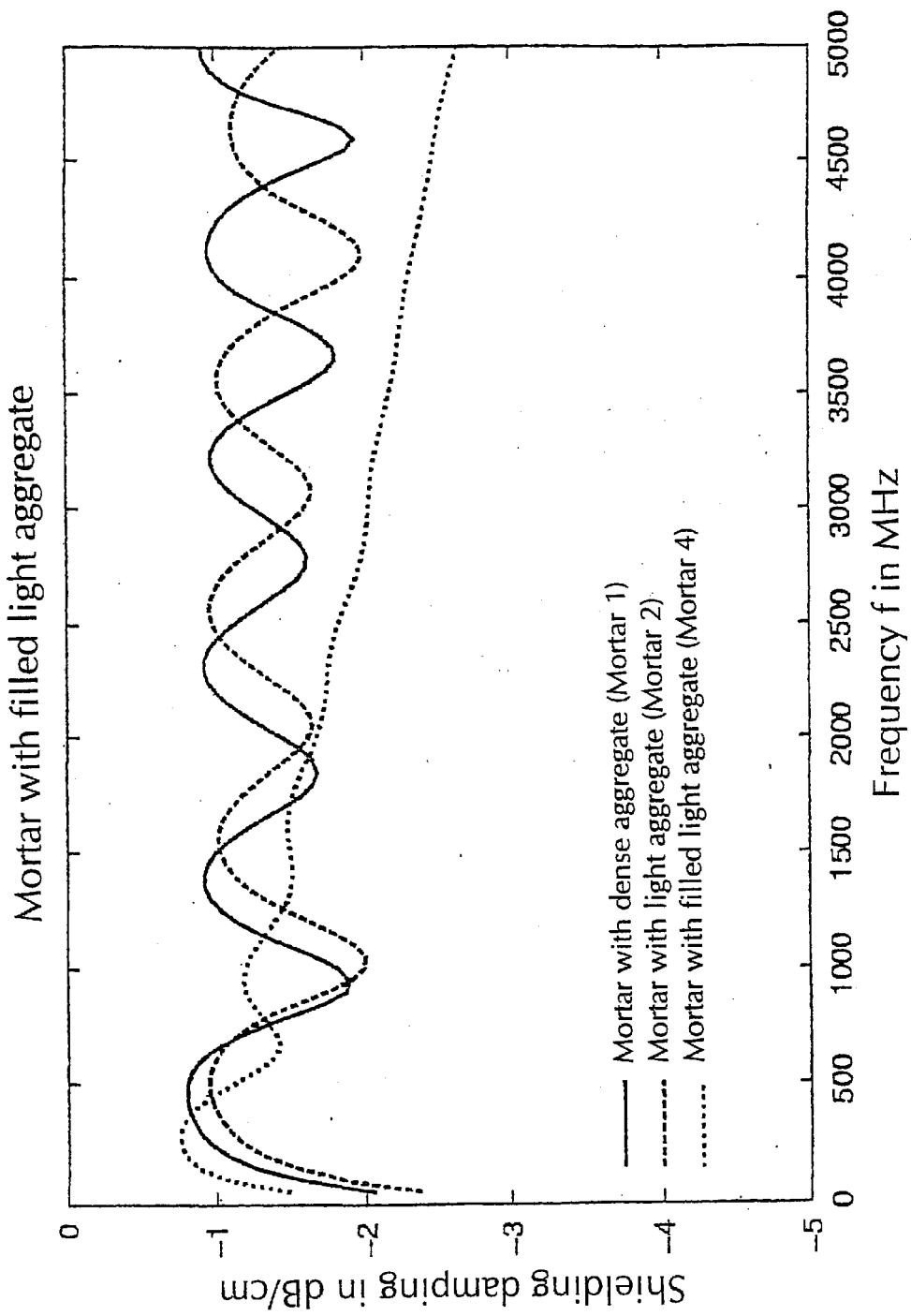
FIG. 2 is a graph showing shielding levels versus frequency of examples of mortar mixtures of several examples filled with light aggregate.

The curves of the results of the measurements of the mortar mixtures are shown in FIGS. 1 and 2.

What is claimed is:

1. Electromagnetic absorber granulate aggregate composite comprising:
   a highly porous granulate layer of at least one of glass and ceramic porous spheres; and
   a coating layer thereon of at least one of ferrite and an electrically conductive material.

2. Electromagnetic absorber granulate aggregate composite comprising:
   a highly porous granulate of at least one of glass and ceramic porous spheres; and
   a filling therein comprising at least one of ferrite and an electrically conductive material.

3. The electromagnetic absorber composite of claim 1 or 2, wherein the electrically conductive material comprises at least one of a metal and carbon.

4. The electromagnetic absorber composite of claim 1 or 3, wherein the granulate is of particle size from 0.2 to 5 mm and the coating is of thickness from 10 $\mu$m to 300 $\mu$m.

5. The electromagnetic absorber composite of claim 4, wherein the thickness of the coating is from 100 $\mu$m to 300 $\mu$m, the thickness of the coating being less than 30% of the diameter of the uncoated granulate.

6. The electromagnetic absorber composite of claim 1 or 2, wherein the ferrite is a Mn—Zn ferrite, a Ni—Zn ferrite, a Ba-ferrite and/or a Sr-ferrite, a Sc—Co-substituted or Ti-substituted hexaferrite having a garnet structure.

7. The electromagnetic absorber composite of claim 1 or 2, wherein the coating or filling, respectively, comprises a Ni—Zn ferrite or a Ba ferrite, the ratio by weight of carbon to ferrite being greater than 0.225.

8. Method of producing absorber granulate composite of claim 1, comprising finely grinding the coating material, suspending the finely ground coating material in a binder and coating the suspension onto said granulate.

9. Method of claim 8, wherein the suspension is coated onto the granulate by at least one of a fluidized bed, mixing granulation, plate granulation and dip-coating method.

10. Method of producing absorber granulate composite of claim 2, comprising granulating glass powder in the presence of a blowing agent, a powder of the coating material and a binder thereby to produce a moist crude granulate and subjecting the crude granulate to heat thereby to dry, solidify and expand the granulate, to produce the absorber granulate.

11. Method of producing electromagnetic radiation shielding, comprising applying a coating comprising the absorber granulate of claim 1 or 2 in admixture with organic and/or inorganic binder onto masonry.

12. Method of producing electromagnetic radiation shielding, comprising applying a coating comprising the absorber granulate of claim 1 or 2 in admixture with organic and/or inorganic binder onto a substrate comprising a wall.

13. Method of producing a shaped object suitable for magnetic shielding, comprising forming a shapeable composition comprising the absorber granulate of claim 1 or 2 as filler in an organic and/or inorganic matrix and shaping said composition to form said shaped object.

14. Method of producing electromagnetic shielding of claim 13, wherein the shaping comprises spraying the composition into a hollow mold.

15. Method of producing electromagnetic shielding of claim 13, wherein the shaping comprises extruding the composition.

16. Method of producing electromagnetic shielding of claim 13, wherein the shaping comprises rolling the composition.

17. Method of producing electromagnetic shielding of claim 13, wherein the shaping comprising casting the composition to form the shaped object as a sheet.

* * * * *